Oct. 28, 1952 — C. B. SMITH — 2,615,301
CENTRIFUGAL DIFFUSER
Filed Nov. 9, 1946 — 2 SHEETS—SHEET 1
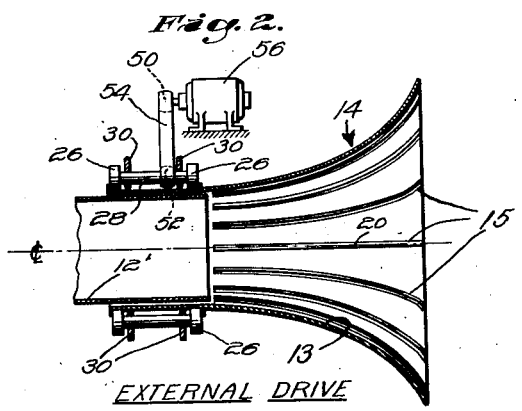
Fig. 2. EXTERNAL DRIVE
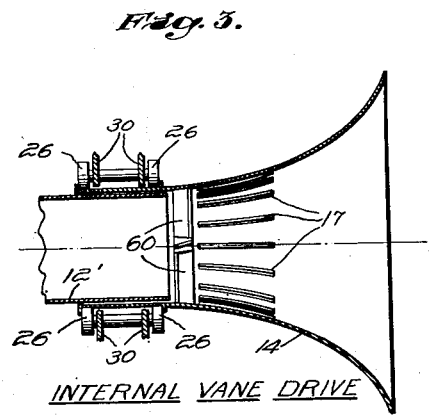
Fig. 3. INTERNAL VANE DRIVE
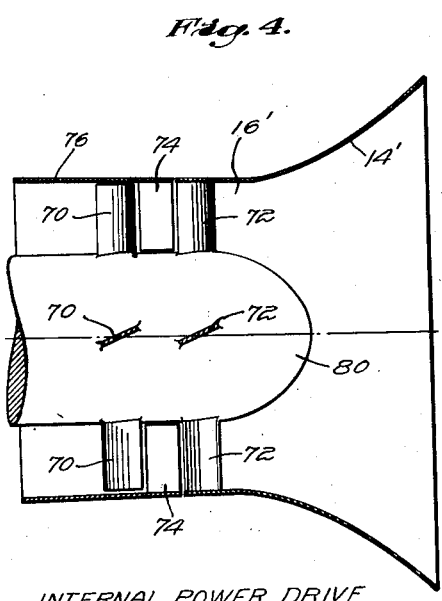
Fig. 4. INTERNAL POWER DRIVE
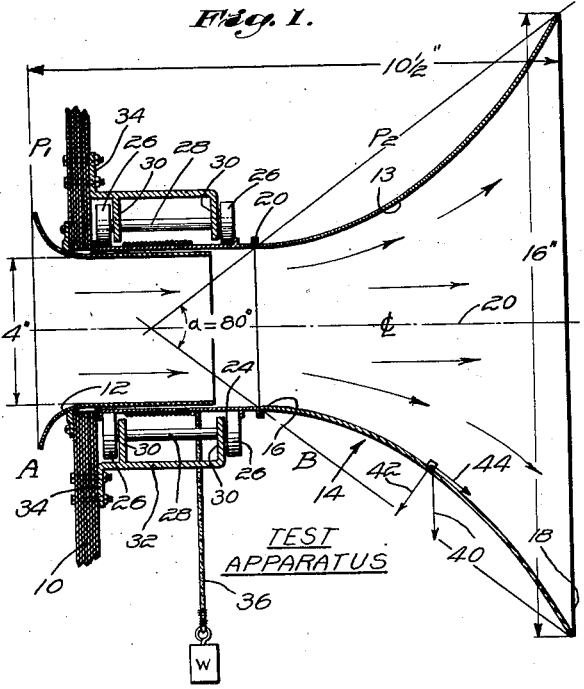
Fig. 1. TEST APPARATUS
INVENTOR
C. Branson Smith
BY H. Hume Mathews
ATTORNEY

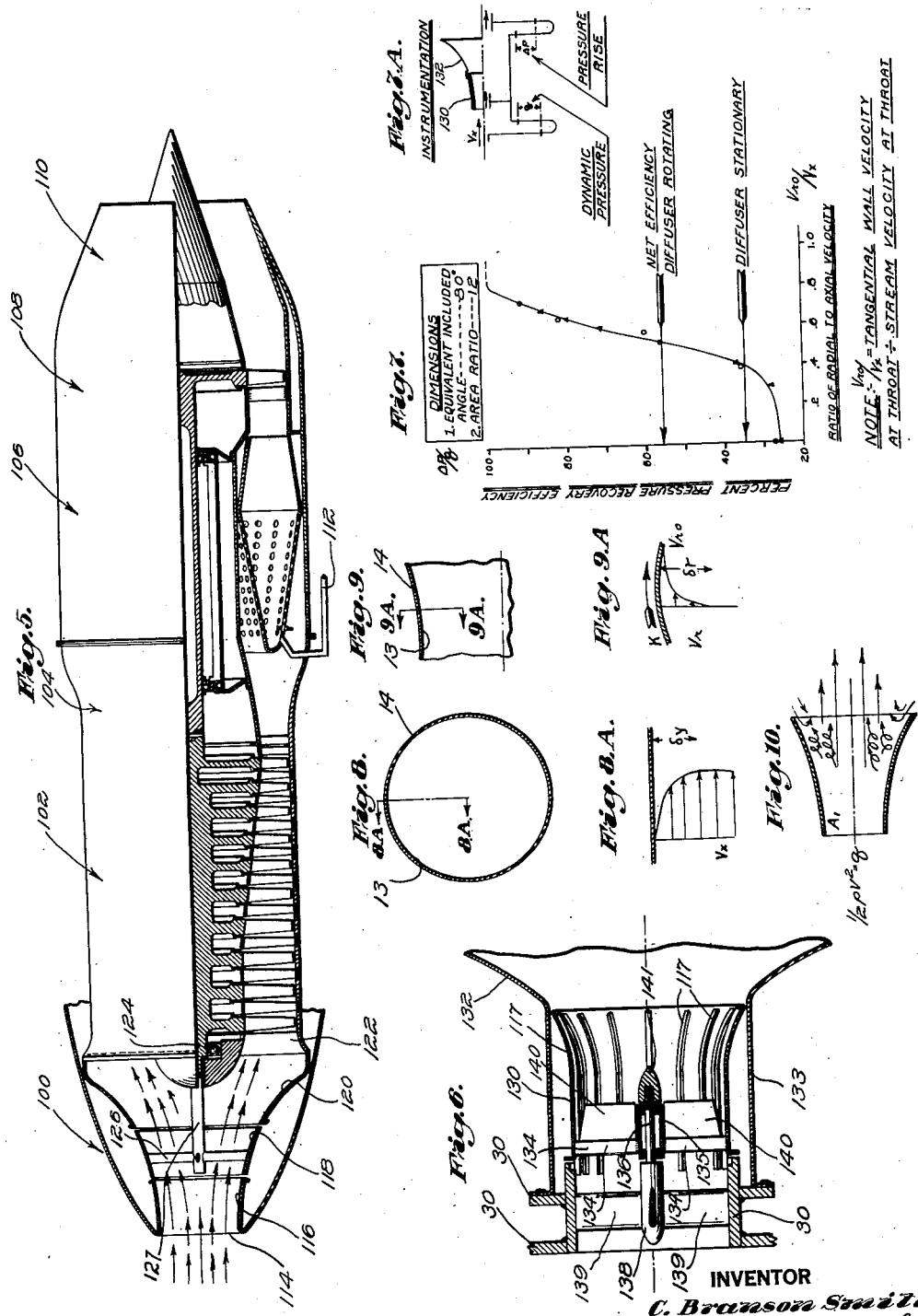

Patented Oct. 28, 1952

2,615,301

UNITED STATES PATENT OFFICE 2,615,301

CENTRIFUGAL DIFFUSER

Charles Branson Smith, Manchester, Conn., assignor to United Aircraft Corporation, East Hartford, Conn., a corporation of Delaware Application November 9, 1946, Serial No. 709,049

12 Claims. (Cl. 60—39.36)

Diffusers have been used for many years in various arts to convert a stream of gas or liquid from a condition of high velocity and low pressure to a condition of low velocity and high pressure. Thus, there exists a pressure rise along the diffuser, the pressure being higher at the large end. The kinetic energy of the fluid stream is sufficient to carry the fluid against this pressure rise. Whenever a viscous fluid flows over a boundary surface there is a "layer" or relatively thin portion of the fluid adjacent the surface which is retarded in velocity, for instance by friction with the surface over which the fluid flows, so that a boundary layer of fluid is formed which has a velocity very much less than the velocity of the central or main portion of the fluid stream. This boundary layer, of reduced velocity and momentum, does not have sufficient energy to carry the fluid therein against the pressure rise created in the main body of the fluid as it flows through the diffuser. Normally a transverse interchange of fluid occurs between the fluid of the main stream and the fluid of the boundary layer; in effect, the boundary layer robs energy from the central portion of the stream. Because there is a limit to the amount of energy which can be transferred across a stream in this manner it has been found in practice that the walls of a diffuser cannot diverge at more than about 6 to 8 degrees (included angle) without causing the flow to break away from the wall. For this reason diffusers have generally been made very long, particularly in installations having high pressure rises.

The present invention is an outgrowth of a quest for a high rate of expansion diffuser of reasonable efficiency. Such a diffuser, because of the flow separation, normally has a low efficiency:

$$\eta = \frac{\Delta P}{q}\left(1-\left(\frac{A1}{A2}\right)^2\right)$$

where:

$\eta$ = Percent pressure recovery
$\Delta P$ = Pressure rise across diffuser
$A1$ = Entrance area
$A2$ = Exit area
$\epsilon = \frac{1}{2}\rho V_x^2$ = Dynamic pressure at inlet This separation (see Fig. 10 of the accompanying drawing) is due to the energy deficiency in the boundary layer which prevents it from advancing against the pressure gradient. It has often been demonstrated that separation may be prevented and a high rate of expansion made possible by making up the energy deficiency either by adding energy to the boundary layer with jets or by forming a new high energy layer by sucking off the old. Both methods have thus far proven to be relatively inefficient ways of energizing the layer; the first because a boundary jet is unstable and some of its energy goes to accelerating the free stream rather than the boundary layer, and the second because the considerable amount of energy left in the sucked off boundary layer is largely lost in the accompanying duct system. In addition, both methods sometimes involve prohibitive mechanical complications.

According to this invention, the boundary layer of fluid next to selected portions or all of the interior wall surfaces of a diffuser is mechanically energized in a novel and relatively simple but efficient manner, thereby enabling the diffuser to be made more efficient and at the same time much shorter, with considerably greater angles of divergence, or greater rates of change in cross-sectional area. Further, the present invention enables the pressure recovery in a diffuser to be increased, in some cases to 100% of the theoretical static pressure that can be produced by conversion of the kinetic energy of the fluid entering the diffuser.

In the embodiments of the invention illustrated in the drawings, a component of centrifugal force is added to the fluid in the boundary layer of an expanding fluid passage, or diffuser. This is preferably done by rotating all or a part of the wall of the passage. The centrifugal force on the boundary layer particles causes them to move outward and along the diffuser wall against the pressure rise in the diffuser.

Other objects and advantages of the invention will be apparent from the specification and claims, and from the accompanying drawings which illustrate what are now considered to be preferred embodiments of the invention.

Fig. 1 is a longitudinal cross-sectional diagrammatic view of a test apparatus including a centrifugal diffuser, having diverging rotating walls forming an expanding fluid passage, constructed according to the teaching of this invention.

Fig. 2 shows a modification of the diffuser of Fig. 1, in which an external driving means, such as an electric motor, rotates the diffuser and in which the interior wall surface thereof is provided with full length vanes for rotating the boundary layer.

Fig. 3 is a view like Fig. 2 but showing a further modification of the invention, in which the diffuser is rotated by vanes actuated by the fluid stream and in which the inlet portion only of the inner wall surface of the diffuser is provided with vanes for rotating the boundary layer.

Fig. 4 illustrates a still further modification in which the diffuser wall is carried by and is rotatable with the last row of blades, or the last stage, of an axial flow compressor or turbine.

Fig. 5 is a schematic longitudinal view, partly in section, of a turbo-jet aircraft engine having a compressor inlet portion constructed according to the teaching of the present invention.

Fig. 6 is a view similar to Fig. 3 showing a modification of the invention in which only the inlet portion of the diffuser is rotated, the remainder being stationary.

Fig. 7 is a graph showing test results obtained from operation of the form of the invention of Fig. 6.

Fig. 7A shows the instrumentation used in obtaining the data plotted in Fig. 7.

Figs. 8, 8A, 9 and 9A are diagrams representing the relation between certain axial and rotational velocities of the fluid stream in various parts of the rotating diffuser.

Fig. 10 shows diagrammatically how flow separation may occur in a conventional diffuser.

Figure 1 shows a test apparatus which illustrates the principle and operation of the invention. Two chambers A and B, separated by a wall partially shown at 10, have pressures P1 and P2 maintained therein in a known manner by a fluid pressure regulating apparatus (not shown). Pressure P1 in chamber A is maintained at a selected value higher than the value of pressure P2 in chamber B so that a fluid flow is created in the direction of the arrows from the chamber on the left-hand side of the wall 10 through the converging nozzle 12 and the diffuser 14 into the chamber on the right-hand side of the wall. Nozzle 12 is provided merely as a part of the best apparatus for introducing a high velocity stream into the inlet portion 16 of the diffuser; it forms per se no part of the present invention.

The diffuser 14 of Fig. 1 comprises basically a trumpet shaped wall or surface of revolution which is of constantly increasing cross-sectional area, or which diverges in the direction of fluid flow. While other wall shapes may be used, the trumpet shape of Figure 1, having a rate of expansion adjacent the outlet which is greater than that adjacent the inlet, is particularly suitable for use with the present invention. It has an effective included angle, $a$, of about 80° and increases much more rapidly in cross-sectional area and is much shorter in length for a given difference in pressure than a conventional diffuser. Furthermore, and most important, the diffuser of the present invention is caused to rotate during operation about its axis 20.

In order to provide for such rotation the diffuser is welded or bolted to a cylindrical section 24 rotatably mounted on rollers or bearings 26. These rollers are carried by shafts 28 secured in annular flanges or rings 30 projecting inwardly from a supporting beam 32 bolted to the wall 10 at 34. A flexible cable or rope 36 wrapped around the cylinder 24 effects rotation of the cylinder 24 (and the diffuser) when weight W is dropped or released. This means of rotating the diffuser by a falling weight is intended for use only with the test apparatus of Fig. 1; as a matter of fact a more convenient way for rotating the diffuser during test may be by utilizing an air turbine (not shown) comprising a row of vanes mounted in a row around the outer wall of the diffuser, rotation being induced by directing a jet from a compressed air nozzle against the vanes.

In operation of the test apparatus, a high velocity stream of fluid (such as air or water) is discharged into the inlet 16 of diffuser 14 by nozzle 12, while the diffuser is being rotated. Rotation of the diffuser does not materially affect the main or central portion of the stream; however this portion of the fluid is not retarded by the diffuser walls and its velocity pressure is readily converted or diffused into static pressure as its flows through the expanding fluid passage bounded by the inner wall surface 13 of the diffuser. Rotation of the diffuser does affect the peripheral or "boundary" portion of the stream, where the flow is retarded by the diffuser walls. As the wall rotates it tends to drag the boundary layer particles with it and thus tends to rotate the relatively thin annular film or layer of air immediately adjacent the surface 13 of the diffuser wall. The angular velocity thereby imparted to the particles creates a centrifugal force which is dependent in amount upon the rate of rotation of the diffuser and the distance of the surface 13 of the diffuser from the axis of rotation. It will be seen that the centrifugal force upon a particle at various positions along the surface 13 becomes greater as the interior diameter of the diffuser becomes greater.

This centrifugal force applied to the particles of the boundary layer fluid by rotation of the diffuser is illustrated schematically for a single particle of air at 40 in Fig. 1. It is exerted in a direction normal to the axis of rotation 20 and has components 42 and 44 respectively normal to and tangential to the surface 13 at the position of the particle. Component 42 tends to hold the boundary layer particles in their normal position adjacent the interior surface of the diffuser wall and thus to prevent break-away or separation of the flow from the wall, while the component 44 tends to increase the velocity of the boundary layer particles in the direction of fluid flow, with the same result. The net effect is to energize or to increase the kinetic energy of the boundary layer particles and thereby enable the diffuser to be made very short with a high rate of increase cross-sectional area without causing separation of the stream from the diffuser walls.

With reference now to Fig. 2, diffuser 14 is formed and mounted for rotation in a manner similar to that shown in Fig. 1. However, the driving means for rotating the diffuser comprises a pair of pulleys 50, 52, a connecting belt 54 and a motor 56. Motor 56 drives one of the support shafts 28 causing the rollers 26 to turn and thereby rotate the diffuser 14 about axis 20. This figure also shows a plurality of axially extending, inwardly projecting vanes 15 on the interior surface 13 of the diffuser. These vanes, which are particularly useful where the stream entering the diffuser has a relatively thick boundary layer, extend inwardly in planes including the axis of rotation. The depth of the vanes depends on the thickness of the boundary layer already existing in the fluid entering the rotating portion of the diffuser and consequently is a function of the particular design in which the diffuser is incorporated. For example, the vanes of the apparatus illustrated in Fig. 2 extend radially inward a distance equal to about 3% of the diameter of the diffuser at the inlet thereof. In general, the depth of each vane will not be more than approximately 5% of the diameter of the diffuser throat. Consequently, though the vanes force the boundary layer air to rotate with the diffuser wall, they do not materially affect the flow of the main fluid stream.

In the modification of Fig. 3, the diffuser driving means comprises a plurality of internal vanes or blades 60 constituting a windmill extending transversely across and fixed to the inlet end of the diffuser. Fluid entering the diffuser impinges upon vanes 60 and thereby causes the diffuser to rotate at a rate determined by the pitch of the vanes and the velocity and mass of the entering fluid. Vanes 60 may be made adjustable in pitch, in a known manner, in order to adjust the velocity of the diffuser relative to the velocity of the stream. The vanes 17 of Fig. 3 are similar to and have the same function as vanes 15 of Fig. 2. However, they are provided only at the inlet portion of the diffuser and extend less than half its length.

In Fig. 4, an axial flow compressor comprising rows of moving blades 70 and 72 alternating with stationary vanes 74, discharges into a diffuser 14' constructed according to the present invention. Blades 70 and 72 are mounted on a drum 80, driven in a known manner as by a motor or turbine. Fluid pumped by the first stage of compressor blades flows over the set of stationary vanes 74 carried by compressor casing 76 and then over the second stage of compressor blades and into the inlet section 16' of the diffuser 14'. The diffuser may be supported by the blades 72 and is thus rotatable with the drum 80. Thus the power required to rotate the diffuser and the power required to drive the compressor are derived from the same source. While only two stages of rotatable blades are shown in Fig. 4 it will be obvious that additional compressor stages of rotating blades and stationary vanes, corresponding to the blades 70 and vanes 74, may be provided. The apparatus of Fig. 4 may also be considered as the exhaust section of a turbine; the only difference being that in the case of a turbine the blades 70 and 72 would absorb power from the stream and drive drum 80 and diffuser 14'.

The turbo-jet engine of Figure 5 comprises an inlet diffuser section 100, an axial flow compressor section 102, a compressor discharge diffuser section 104, a burner section 106, a turbine section 108 and a reaction nozzle section 110. With the exception of the inlet diffuser section 100, all the parts may be of conventional design and operation. The turbine and compressor are interconnected so that power derived from the turbine operates the compressor which, in turn, feeds air through the diffuser section 104 to the combustion chamber. Fuel is injected into the compressed air in the combustion chamber by fuel pipes, such as shown at 112, for adding heat to the air. The resultant gases are discharged as hot gas to the turbine 108. Power output is produced in the form of thrust created by the reaction of the jet of gas discharged from the nozzle 110.

The inlet diffuser section 100 has its inner wall constructed according to the present invention. Ram air, entering inlet opening 114 at the high velocity of the unit relative to the free or ambient air and at ambient air pressure, is diffused slightly in the stationary expanding inlet passage 116 and then flows into the rotating diffuser portion 118 where it is further diffused and where the boundary layer is energized by rotation of the diffuser wall. The air then flows into a second stationary diffuser portion 120, from whence it is delivered at a low velocity and high static pressure to the inlet of the compressor section 102.

Stationary wall portions 116 and 120 of the diffuser 100 are supported by, or formed integral with, the casing of the turbo-jet unit. This casing also supports the forward bearing 124 of the turbine-compressor shaft as struts or vanes 122. The rotating diffuser portion 118 is mounted on spokes or vanes 126, extending radially from an extension 127 of the main turbine-compressor shaft. Thus the diffuser wall portion 118 is driven by the turbine during operation of the jet unit. The resulting increase in efficiency derived from the rotating diffuser also increases the efficiency of each of the following sections of the power plant and thereby increases the efficiency of the whole installation even more than would be provided by the increase in diffuser efficiency considered alone.

The diffuser of Fig. 6 comprises a rotating vaned inlet portion 130 and a stationary, smooth walled, outlet portion 132. Wall 132 is supported by a cylinder 133 secured to a mounting 30. Wall 130, and vanes 117 projecting a short distance inwardly therefrom, are rotatably supported by vanes 134 and hub 135 on shaft 136. This shaft is fixed at one end to a stationary hub 138 supported by struts 139 within the mounting 30. A tail cone or fairing 141 is fixed to the other end of the shaft. Vanes 134 are made of airfoil shape and positioned at an angle with respect to the direction of airflow through the diffuser so that they act as windmills and cause the inlet diffuser portion 130 to rotate about the shaft 136. Adjustable flaps 140, hinged to the trailing edge of each vane 134, are provided to change the effective pitch of the vanes and thus effect an adjustment of the speed of rotation of member 130 relative to the axial velocity of the airflow through the diffuser.

THEORY AND OPERATION

When a diffuser wall is rotated, for instance as shown in any one of the several modifications of the invention illustrated in the drawing and described above, the air next to the wall, the boundary layer, is rotated with it. This rotary velocity represents an increase in the energy of this layer. When the diffusion begins, the rotary velocity tends to fall so as to maintain constant angular momentum. This deceleration results in a pressure rise. Such a pressure rise is needed in the boundary layer in order to match the general pressure rise in the stream. This rise normally would have to be supplied by conversion of the much needed axial velocity to pressure; being relieved of this duty strengthens the boundary layer. This, physically, is how the increased energy represented by the rotary velocity enters the picture.

Perhaps a simpler way to look at it, however, is to note that the centrifugal force acting on the elements in the rotating boundary layer has a component 44 (Fig. 1) which tends to move the layer along against the gradient.

The optimum conditions exist when just enough energy is added to prevent separation. This condition, for many installations, is most nearly fulfilled by rotating only the inlet to the diffuser (see Figs. 5 and 6) the greater portion of the diffuser itself being stationary.

A limited analysis indicating generally the optimum rotary speeds for certain applications of the invention follows:

Analysis

I. Pressure gradient due to axial flow=

$$\left(\frac{dP}{dx}\right)_x$$

or the derivative of P with respect to $x$ in the axial or $x$ direction.

(A) By Bernoulli's Theorem:

$$\tfrac{1}{2}\rho V_x^2 + P = C$$

where:
$\rho$=Density of the stream
$V_x$=Axial velocity of the stream
$P$=Static pressure of the stream
$C$=Constant Differentiating (A) with respect to $x$:

$$\frac{dP}{dx} = -\tfrac{1}{2}\rho 2 V_x \frac{dV_x}{dx}$$

or (1) $\qquad \left(\dfrac{dP}{dx}\right)_x = -\rho V_x \dfrac{dV_x}{dx}$ (B) By continuity equation $$\rho V_x A = C_1$$

where:
$A$=Cross-sectional area of diffuser
$C_1$=Constant

Differentiating (B) with respect to $x$:

$$\rho V_x \frac{dA}{dx} + \rho A \frac{dV_x}{dx} = 0$$

or $$\rho V_x \frac{dA}{dx} = -\rho A \frac{dV_x}{dx}$$

or (C) $\qquad \rho \dfrac{V_x^2}{A}\dfrac{dA}{dx} = -\rho V_x \dfrac{dV_x}{dx}$ Equating (1) and (C):

(2) $\qquad \left(\dfrac{dP}{dx}\right)_x = \rho \dfrac{V_x^2}{A}\dfrac{dA}{dx}$ II. Pressure rise in boundary layer due to rotary deceleration=

$$\left(\frac{dP}{dx}\right)_r$$

(D) $\qquad \tfrac{1}{2}\rho V_r^2 + P = C$ where:
$V_r$=Tangential velocity at radius $r$ Differentiating (D) with respect to $x$:

$$\frac{dP}{dx} = -\tfrac{1}{2}\rho 2 V_r \frac{dV_r}{dx}$$

or (3) $\qquad \left(\dfrac{dP}{dx}\right)_x = -\rho V_r \dfrac{dV_r}{dx}$

By law of conservation of angular momentum:

(E) $\qquad I\omega = I\dfrac{V_r}{r} = \text{Constant}$ where:
$I$=moment of inertia=$\rho r^2$ so $$I\omega = \rho r^2 \frac{V_r}{r} = C_2 = \text{Constant}$$

or (F) $\qquad I\omega = \rho r V_r = C_2$

Differentiating (F) with respect to $x$:

$$\rho r \frac{dV_r}{dx} + \rho V_r \frac{dr}{dx} = 0$$

or (G) $\qquad \dfrac{\rho V_r^2}{r}\dfrac{dr}{dx} = -\rho V_r \dfrac{dV_r}{dx}$ Equating (G) and (3):

(H) $\qquad \left(\dfrac{dP}{dx}\right)_r = \rho\dfrac{V_r^2}{r}\dfrac{dr}{dx}$

But $$\pi r^2 = A$$

(J) $\qquad r = \left(\dfrac{A}{\pi}\right)^{1/2}$ (K) $\qquad \dfrac{dr}{dx} = \tfrac{1}{2}\dfrac{1}{\sqrt{\pi}}\dfrac{1}{\sqrt{A}}\dfrac{dA}{dx}$ Substituting (J) and (K) into (H):

$$\left(\frac{dP}{dx}\right)_r = \rho \frac{V_r^2}{\sqrt{\dfrac{A}{\pi}}}\tfrac{1}{2}\frac{1}{\sqrt{\pi A}}\frac{dA}{dx}$$

or (4) $\qquad \left(\dfrac{dP}{dx}\right)_r = \rho\dfrac{V_r^2}{2A}\dfrac{dA}{dx}$ III. Solve for $$\frac{V_r}{V_x}$$

Such that $$\left(\frac{dP}{dx}\right)_x = \left(\frac{dP}{dx}\right)_r$$

Equating (2) and (4):

$$\rho\frac{V_x^2}{A}\frac{dA}{dx} = \rho\frac{V_r^2}{2A}\frac{dA}{dx}$$

$$V_x^2 = \frac{V_r^2}{2}$$

$$\frac{V_r}{V_x} = \sqrt{2}$$

$$\frac{V_r}{V_x} = 1.41$$

Conclusion

If $$\frac{V_r}{V_x}$$

has the above deduced value (1.41) then the pressure rise due to vortex dissipation will equal the pressure rise in the stream; with the result that the axial velocity of the boundary layer will remain constant.

Interpretation

As indicated by Fig. 8A the axial velocity at the wall is zero. Neglecting for the moment friction and turbulent mixing, we can say that all of the pressure rise along this stream line (the one next to the wall) must come from vortex dissipation. Fig. 9A indicates that at this point $$V_r = V_{r_0}$$

Thus to keep this layer moving forward $$\frac{V_{r_0}}{V_x} = 1.41$$

This specifies the required rotary speed.

At a point distant from the wall $\delta y$ (Fig. 8A) the stream is moving at the general stream velocity (velocity outside of the boundary layer)

and therefore has the power to overcome the pressure rise of the stream. If $\delta r$ (Fig. 9A) is made equal to $\delta y$, then no vortex energy will be put into the stream at and beyond this point ($\delta y$). This indicates, in theory at least, how much rotating section must be put in front of the diffuser. This varies for each value of $V_x$.

Between the wall and the stream line at distance $\delta y$ from the wall, the vortex rotation put into the stream (as indicated by Fig. 9A) is in general in the right proportion to meet the deficiency in axial velocity as indicated by Fig. 8A.

The foregoing idealized conception, it must be realized, will be compromised by factors neglected in this simple analysis. The presence of friction for example will result in a certain amount of vortex dissipation without the accompanying pressure rise. Hence the ratio $$\frac{V_{r_0}}{V_x}$$

must be somewhat greater than 1.41 to maintain constant axial velocity.

Since $V_x$ decreases as the air passes down the diffuser, whereas $V_{r_0}$, assuming the whole diffuser rotates, increases, it is apparent that the ratio $$\frac{V_{r_0}}{V_x}$$

increases. Thus if the ratio of 1.41 is set at the throat, it will be much greater than necessary (necessary to maintain constant axial velocity) further downstream. Furthermore, it is apparent that due to mixing it is not actually necessary to maintain a ratio of 1.41 at the inlet. The optimum point at which the ratio should be set equal to 1.41 can only be determined by experiment. This analysis indicates that, in any event, the ratio $$\frac{V_r}{V_x}$$

at the diffuser throat need never be greater than 1.41 in order to obtain a centrifugal pressure rise in the boundary layer equal to the pressure rise due to diffusion of the main body of the stream. In actual practice due to factors neglected in this analysis, this ratio may be as low as $$\frac{V_r}{V_x} = .5$$

and still prevent separation of flow.

Figs. 7 and 7A illustrate the results of one such experiment. A diffuser like that of Fig. 6, having a fixed outlet wall portion 132 and a rotating inlet wall portion 130, was instrumented with manometers as shown in Fig. 7A. The percent pressure recovery obtained in the diffuser for various ratios of the tangential velocity of the rotating wall at the throat to the axial stream velocity of the air entering the diffuser were as shown in Fig. 7. In this instance a pressure recovery of 100% was obtained at a ratio of $$\frac{V_{r_0}}{V_x} = \text{about } .8$$

at the throat.

The test results of Figs. 7 and 7A also show that the net efficiency of the diffuser, considering the power required to rotate the diffuser wall, can be considerably increased by rotating a portion of the diffuser wall. In the case of Figs. 7 and 7A, this increase was from about 35% to about 55%, even though the apparatus was not designed with this particular purpose of increasing net efficiency in view.

It is to be understood that the invention is not limited to the specific embodiment herein illustrated and described, but may be used in other ways without departure from its spirit as defined by the following claims.

I claim:

1. A fluid velocity-pressure converter comprising a rotatable hollow wall having fluid impelling means on the interior surface thereof, said impelling means extending inwardly from said wall a distance less than five per cent of the minimum interior diameter of said wall.

2. Apparatus according to claim 1, in which said impelling means extends longitudinally for the full length of said rotatable hollow wall.

3. Apparatus according to claim 1 in which said impelling means extends longitudinally a distance less than half the full length of said rotatable hollow wall.

4. Apparatus according to claim 1, in which said wall is externally driven by means such as a motor.

5. Apparatus according to claim 1, in which said wall is internally driven by the main or central portion of the fluid stream passing therethrough.

6. In combination with a diffuser having a stationary diverging wall forming a fluid passage which expands in the direction of fluid flow, a rotatable wall forming an inlet passage for said stationary wall, vanes extending axially along the inner surface of said rotatable wall, and vanes extending transversely across said inlet passage for rotating said rotatable wall.

7. In a diffuser forming a substantially open straight line fluid passage, means comprising a rotating inlet wall portion for rotating an annular layer of boundary fluid about the axis of the main or central portion of a fluid stream flowing through said diffuser, said rotating wall portion including axially extending vanes which substantially penetrate the boundary layer, and a stationary diffuser wall portion receiving fluid discharged from said rotating wall portion.

8. In a diffuser forming a substantially open fluid passage, means comprising a rotating inlet wall portion for rotating an annular layer of boundary fluid about the axis of the main or central portion of a fluid stream flowing through said diffuser, and vanes on said inlet wall portion extending not more than five percent of the diffuser throat diameter into the fluid stream and affecting only that portion of the stream of relatively low axial velocity in the boundary layer thereof.

9. In a diffuser forming a substantially open fluid passage, means comprising a rotating inlet wall portion for rotating an annular layer of boundary fluid about the axis of the main or central portion of a fluid stream flowing through said diffuser, and vanes on the inner surface of said rotating inlet wall portion extending only into that portion of the fluid stream which has an axial velocity of less than approximately one-half the maximum axial velocity of said fluid stream.

10. A divergent fluid carrying duct adapted to have a fluid flow therethrough, said duct having the walls thereof diverging along a central axis from a small diameter input end to a large diameter output end, the angle of divergence being more than 8°, means to force fluid through said duct, means for energizing a boundary layer of said fluid flow adjacent the wall of the duct consisting of means to rotate a portion of said wall about the principal axis of fluid flow through the duct at a rotational speed sufficient to impart a centrifugal component of force to the boundary layer which force is substantially normal to said flow axis thereby impelling the boundary layer generally along said wall in a downstream direction.

11. A duct according to claim 10 including an axial flow compressor having rotatable vanes, said vanes being connected to and rotatable with said rotatable wall portion.

12. A duct according to claim 11 including a combustion chamber receiving fluid from said compressor, and a turbine driven by gases from said combustion chamber, said turbine being connected to and driving said compressor vanes and said rotatable wall portion.

CHARLES BRANSON SMITH.

References Cited

The following references are of record in the file of this patent:

UNITED STATES PATENTS

| Number | Name | Date |
|---|---|---|
| 1,467,227 | Capell | Sept. 4, 1923 |
| 1,614,091 | Van Toff | Jan. 11, 1927 |
| 2,268,358 | Turner | Dec. 30, 1941 |
| 2,321,276 | De Bolt | June 8, 1943 |
| 2,339,575 | Lee | Jan. 18, 1944 |
| 2,441,135 | Chalupa | May 11, 1948 |
| 2,490,066 | Kollsman | Dec. 6, 1949 |

FOREIGN PATENTS

| Number | Country | Date |
|---|---|---|
| 351,278 | Great Britain | June 25, 1931 |
| 539,882 | France | Apr. 8, 1922 |